J. P. COLEMAN.
LOCKING DEVICE.
APPLICATION FILED MAR. 7, 1916.

1,279,272.

Patented Sept. 17, 1918.
3 SHEETS—SHEET 1.

WITNESSES

INVENTOR
John P. Coleman
By
His atty.

J. P. COLEMAN.
LOCKING DEVICE.
APPLICATION FILED MAR. 7, 1916.
1,279,272.
Patented Sept. 17, 1918.
3 SHEETS—SHEET 2.
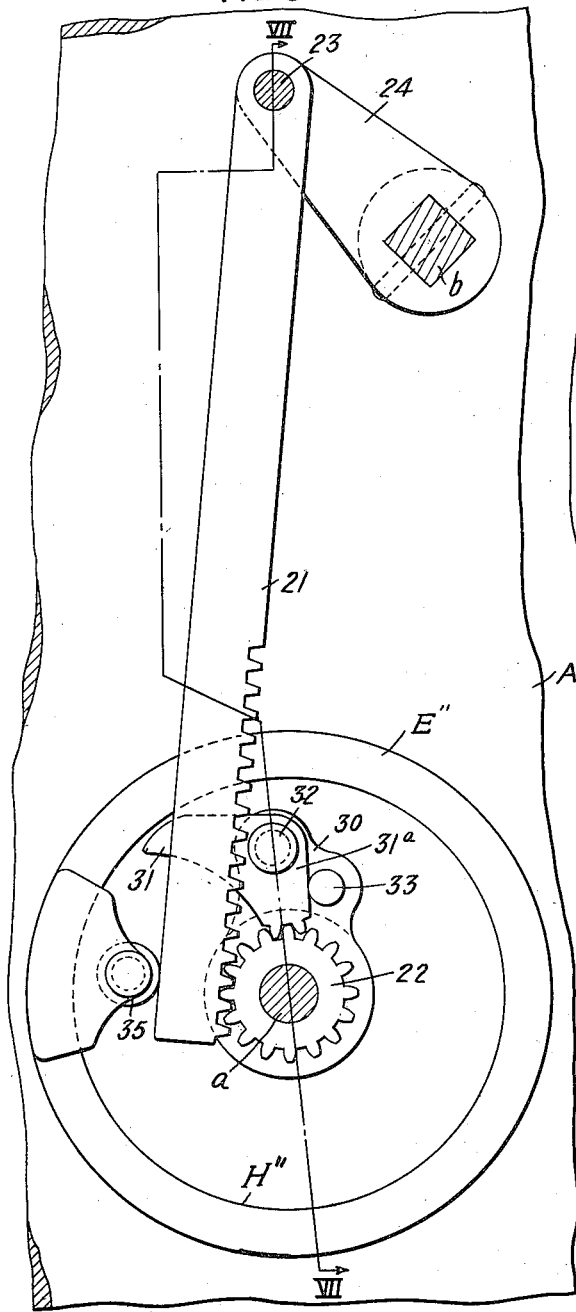
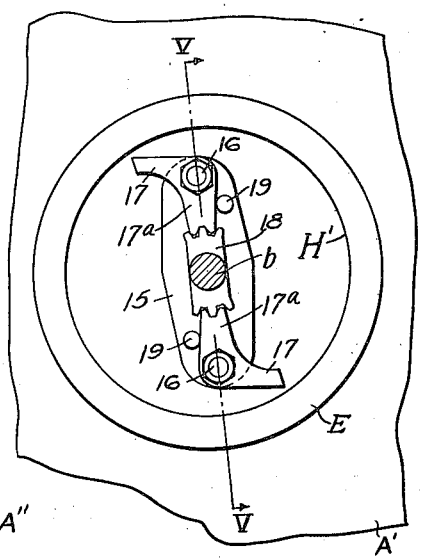
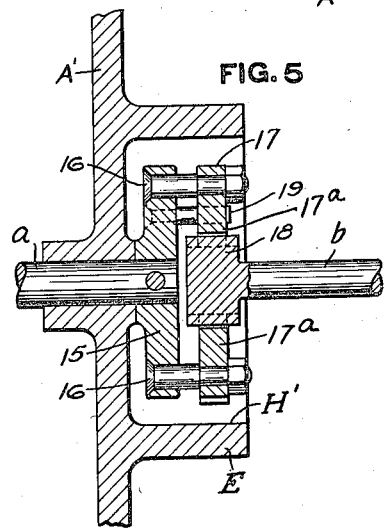
WITNESSES
INVENTOR

UNITED STATES PATENT OFFICE.

JOHN P. COLEMAN, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

LOCKING DEVICE.

1,279,272.  Specification of Letters Patent.  Patented Sept. 17, 1918.

Application filed March 7, 1916. Serial No. 82,704.

*To all whom it may concern:*

Be it known that I, JOHN P. COLEMAN, a citizen of the United States, residing at Edgewood borough, in the county of Allegheny and State of Pennsylvania, have invented certain new and useful Improvements in Locking Devices, of which the following is a specification.

My invention relates to locking devices.

One object of my invention is to provide means for a mechanism comprising a driving and a driven member, for locking the mechanism against movement when the member which is normally driven in one direction of movement attempts to drive the member which for said direction is normally the driver.

I shall describe several forms of mechanisms embodying my invention and then point out the novel features thereof in claims.

Figure 1:
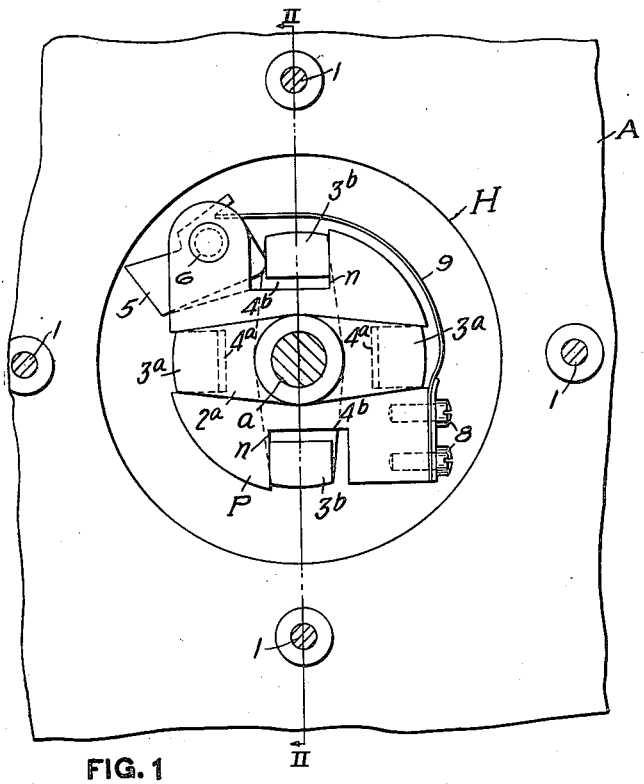
Figure 2:
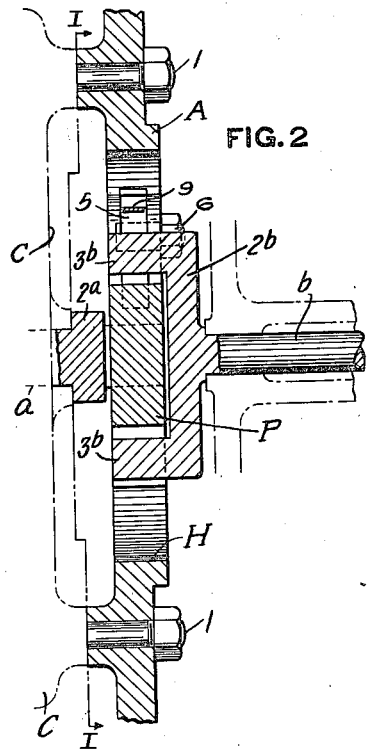
Figure 3:
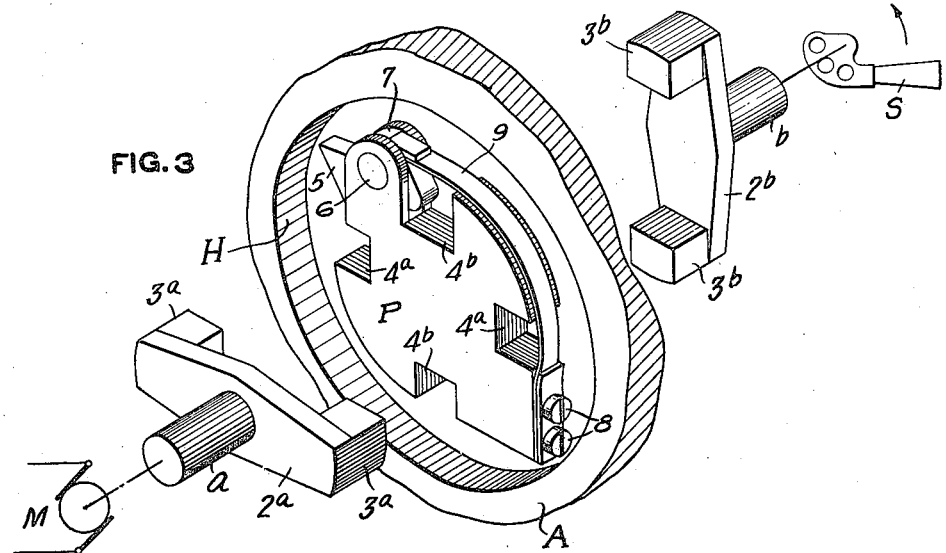
Figure 7:
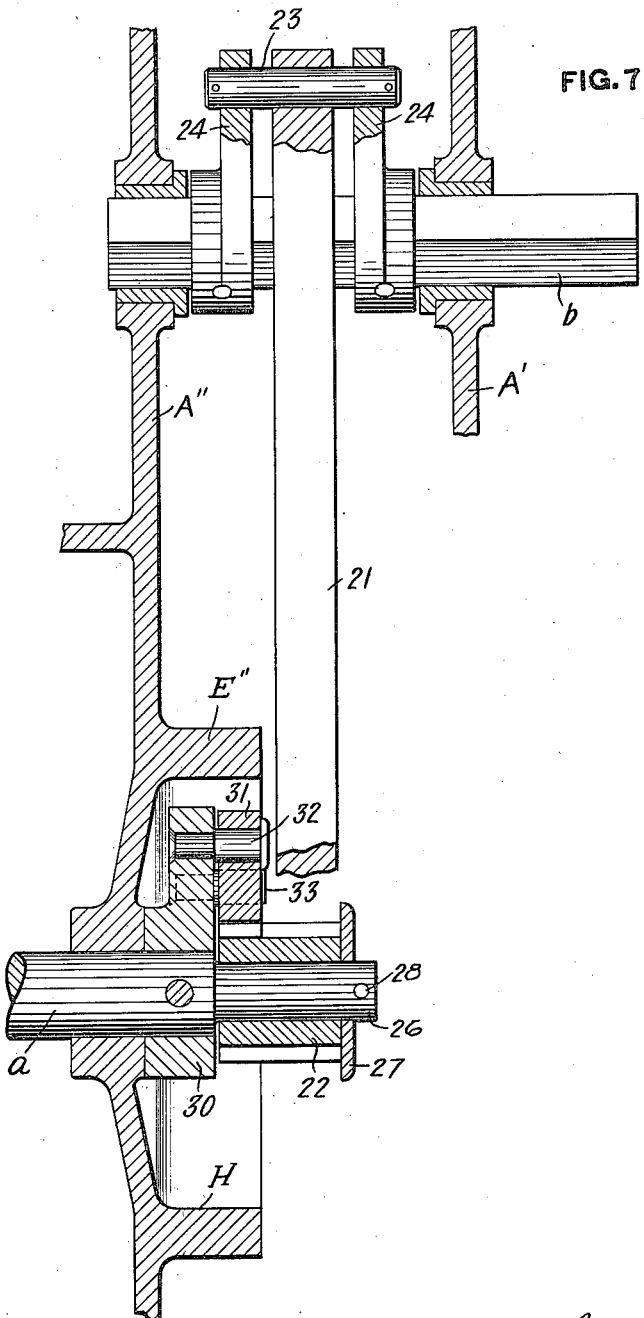

In the accompanying drawings, Figure 1 is a view showing a front elevation of one form of mechanism embodying my invention; this view corresponds to a section of Fig. 2 taken on line I—I looking in the direction of the arrows. Fig. 2 is a view showing a section of Fig. 1 taken on line II—II, looking in the direction of the arrows. Fig. 3 is a perspective view, partly diagrammatic, showing the members of the mechanism shown in Figs. 1 and 2 separated from each other. Fig. 4 is a view showing a front elevation of another form of mechanism embodying my invention. Fig. 5 is a view showing a section of Fig. 4 taken on line V—V looking in the direction of the arrows. Fig. 6 is a view showing a front elevation of a third form of mechanism embodying my invention. Fig. 7 is a view showing a section of Fig. 6 taken on line VII—VII looking in the direction of the arrows.

Similar reference characters refer to similar parts in each of the several views.

Referring first to Figs. 1 and 2, the reference character A designates a metal plate secured by bolts 1 to a support C, and provided with a circular hole H for receiving a device for coupling two co-linear shafts $a$ and $b$ whose center line passes through the center of hole H. This device comprises cross arms $2^a$ and $2^b$ (see also Fig. 3), fixed to the ends of shafts $a$ and $b$ respectively and having lugs $3^a$ and $3^b$ which are inserted into corresponding notches $4^a$ and $4^b$ in a plate P. Notches $4^a$ are preferably just wide enough to receive lugs $3^a$ with little or no play, so that when shaft $a$ is rotated, plate P follows with no appreciable lost motion. Notches $4^b$ on the other hand are considerably wider than lugs $3^b$, as shown distinctly in Fig. 1, so that there can be a considerable amount of angular movement between plate P and shaft $b$. This movement I utilize to control a locking device which I shall now describe.

A pawl 5 is pivoted on a bolt 6 extending through a slot 7 in the upper left hand corner of plate P (see especially Fig. 3). Adjacent its upper end the pawl is notched to receive the tip of a flat spring 9 which is secured to plate P by means of screws 8. The spring holds the pawl 5 in firm contact with one of the lugs $3^b$ so that the pointed tip of the pawl is held out of contact with the surface of hole H as long as this lug remains in engagement with the side of notch $4^b$ marked $n$ in Fig. 1. When, however, this lug $3^b$ moves away from side $n$ of the notch the pawl tip engages the surface of hole H and effectively prevents a counter-clockwise rotation of the plate P and both shafts $a$ and $b$. It is understood that pawl 5 may be of any desired shape; instead of being pointed it may, for instance, be caused to coöperate with the surface of hole H through frictional or similar means whereby the shafts are locked against rotation in either direction as long as the pawl is held out of its normal position. For the purpose of the particular appliance of my invention hereinafter described, it is sufficient to lock the shafts against rotation in only one direction, but it is understood that I do not limit myself to this particular arrangement.

For the purpose of illustration, I have shown my invention embodied in mechanism for the operation of a railway signal by a motor. As indicated diagrammatically in Fig. 3, shaft $b$ is directly connected with a semaphore arm S and shaft $a$ is connected with the armature of a motor M usually through the medium of a reduction gearing. The semaphore S is biased by gravity to the horizontal position wherein it indicates "Stop," or "Danger," and is adapted to be driven by the motor in the direction of the arrow to one or more other positions wherein it gives proceed indications. By reference particularly to Fig. 1 it is apparent that a counter-clockwise rotation of plate P by shaft $a$, i. e. by lugs $3^a$, causes lugs $3^b$ to bear against surfaces $n$ of notches $4^b$ so that pawl 5 remains in its normal position and its tip remains out of engagement with the surface of hole H so that this movement of the semaphore is not interfered with.

Similarly, when the semaphore returns to its horizontal position under the influence of its own bias, it turns shaft $b$ clockwise. During this movement the lugs $3^b$ drive the motor shaft by bearing against surfaces $n$ of notches $4^b$ in plate P so that the pawl 5 stays in its normal position and does not interfere with the rotation of the shaft.

It is apparent, then, that the locking device does not interfere with the operation of the signal as long as it is operated in the proper manner, i. e. caused to give a proceed indication by torque applied through the motor shaft and caused to give a danger indication by torque applied through the semaphore shaft.

When, however, an attempt is made to operate the signal in an improper manner, as by turning the semaphore blade manually away from its "danger" position, the locking device is immediately brought into operation to prevent such movement. For, the moment the blade is lifted, the shaft $b$ is turned counter-clockwise so that lug $3^b$ turns pawl 5 until its tip engages the surface of hole H. The greater the turning effort on the blade the harder is the tip of the pawl wedged into the metal of plate A, making it impossible for the plate P and the two shafts $a$ and $b$ to turn.

Thus an improper operation of the signal is prevented. This is highly important because, for obvious reasons a signal indication should never be allowed to be changed by manual manipulation of the semaphore blade, no matter whether this is done with malicious intent or for the greater convenience of repair work of the signal.

Referring now to Figs. 4 and 5, I have here shown another form of apparatus embodying my invention. Reference character A' designates a fixed metal plate having a hollow cylindrical extension E within which the coupling for shafts $a$ and $b$ is mounted to rotate. This coupling comprises a member 15 pinned to shaft $a$ and provided with studs 16 on which pawls 17 are pivotally mounted for engaging with the inner surface H' of extension E which surface is concentric with shafts $a$ and $b$. For actuating these pawls, the end of shaft $b$ is provided with a cross arm 18 having toothed ends for engaging similar teeth on the ends of arms $17^a$ integral with the pawls. Stops 19 are provided for limiting the movement of the pawls about their pivots in a counter-clockwise direction—their movement in the clockwise direction being limited by the engagement of the pawl tips with surface H' similarly as described for pawl 5 in Fig. 1. In this manner the pawls are so limited in their angular movement that their toothed arms $17^a$ cannot swing out of engagement with cross arm 18.

The operation of this mechanism is as follows. In order to move the semaphore away from the danger position the motor rotates member 15 counter-clockwise, motor torque being transmitted to pawls 17 through pins 16. Arms $17^a$ of the pawls are meshed with arm 18 on the semaphore shaft $b$, consequently, the motor torque tends to turn the pawls counter-clockwise, but this is prevented by stops 19 and shaft $b$ is therefore rotated counter-clockwise by torque transmitted through the gear teeth. Thus, while the signal is being moved toward a proceed indication, the pawls are held in firm contact with their stops 19 through the motor torque and the tips of the pawls are thus kept out of engagement with surface H'. Similarly, when the signal indication is changed to "Danger", the gravity bias on the semaphore rotates shaft $b$ clockwise, forcing arms $17^a$ of pawls 17 into engagement with stops 19, so that pawls 17 are again held out of engagement with surface H' to permit free rotation of the mechanism.

It may be noted here that although two pawls 17 are shown in the drawing only one is necessary for the operation of the mechanism, for evident reasons.

With reference now to Figs. 6 and 7, I have here shown my invention applied to a mechanism wherein the two shafts coupled together are not in one line. Reference character A'' designates a stationary casing adjacent the upper end of which is journaled the semaphore shaft $b$, and in the lower end of which the motor shaft $a$ is mounted in suitable bearings. For transmitting motion from one shaft to the other, I provide a rack 21 meshing with a pinion 22. One end of the rack is connected by a pin 23 to crank arms 24 keyed to shaft $b$, and the other end of the rack is held in mesh with the pinion 22 by roller 35 mounted on a cylindrical extension E'' from casing A''. The pinion 22 is free to turn on shaft $a$, being loosely held on an extension 26 thereof by a circular plate 27 and a pin 28. This pinion may be locked to turn with shaft $a$ through a mechanism which comprises a member 30 pinned to the motor shaft and a pawl 31 pivotally mounted on member 30 by a pin 32. An arm $31^a$ operates the pawl by teeth on the lower end thereof in engagement with pinion 22. A pin 33 on member 30 serves as a stop for limiting the angular motion of pawl 31 in counter-clockwise direction, the motion of the pawl in the opposite direction being limited by engagement of the pawl tip with the inner cylindrical surface H″ of extension E″ which is concentric with shaft a. As shown in Fig. 6 the tip of pawl 31 is adapted to impede rotary movement of the coupling mechanism by frictional contact with surface H″, although the pointed construction of the pawl tip shown in Figs. 1 and 4 may be used equally as well.

In the operation of this mechanism the motor shaft a is driven counter-clockwise in order to move the signal semaphore away from the danger indication. In doing so pins 32 and 33 exert pressure on the pawl 31 which through its arm 31ᵃ in engagement with pin 33 transmits the motor torque to pinion 22 so that the rack is pulled downward and operates the semaphore shaft. Thus the motor torque holds pawl 31 in firm contact with pin 33 and out of engagement with surface H″, so that this rotation is not interfered with. Similarly, for a movement of the signal to the danger indication, the gravity bias of the signal pulls rack 21 upward so that it turns pinion 22 clockwise. The pinion holds arm 31ᵃ of pawl 31 in firm engagement with pin 33 so that the motor shaft is rotated backward and the tip of pawl 31 remains out of engagement with surface H″.

When, however, it is attempted to turn the signal blade by hand away from the horizontal position, rack 21 is pushed downward so that pinion 22 turns counter-clockwise and swings pawl 31 into engagement with surface H″. It is plain that this prevents further movement of the semaphore.

From the above descriptions of various forms of mechanisms embodying my invention it is apparent that an improper operation of the mechanism is resisted, no matter what the angular position of the shafts may be when this operation is attempted. This is of great advantage in the application of my invention to railway signals of the type which are adapted to give two proceed indications, namely, "Proceed" and "Proceed with caution". The latter indication is generally displayed by arresting the semaphore in an inclined position at approximately 45° to the horizontal. For obvious reasons it is just as important to prevent a manual movement of the semaphore from the caution position toward the proceed position as it is to prevent a similar movement of the semaphore away from the horizontal position. In some types of signal mechanisms, the angular position at which the semaphore is held for indicating caution varies throughout several degrees, because of variations of the motor speed due to fluctuations in voltage. As pointed out hereinbefore, with my invention no matter what the angular position in which the semaphore is held, when the attempt is made to turn it by hand toward the proceed position the locking device is brought into operation to prevent the movement. In other words, since the operation of the locking device is entirely independent of the angular position of the semaphore, it is operative at any angular position thereof.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, two movable members capable of limited relative movement, and means controlled by said relative movement and operable at any position occupied by said members for preventing movement of the members when one member attempts to drive the other in one direction but not when said one member drives the other in the reverse direction.

2. In combination, a driven member biased in one direction, a driving member for moving said driven member in opposition to its bias, said members being capable of limited relative movement, and means controlled by said relative movement and operable at any position of said members for preventing movement of said members when force is applied to the driven member to move it in opposition to its bias by means other than said driving member.

3. In combination, a coupling comprising two members capable of limited movement with respect to each other, a fixed member continuous throughout the range of movement of said coupling, and means governed by the relative movement of one member of the coupling with respect to the other for engaging said fixed member to oppose movement of the coupling when one member drives the coupling in one direction but not in the other direction.

4. In combination, two rotatable members capable of limited relative movement, and means operable at any position in the rotation of said members for locking the members against rotation when one member attempts to drive the other in a given direction but not when the said one member drives the other in the opposite direction.

5. In combination, a driving member and a driven member capable of limited relative movement, and means controlled by said relative movement and operable at any position of said members for preventing movement of said driving member by said driven member in one direction but for permitting movement of the driving member by the driven member in the opposite direction.

6. In combination, two rotatable members capable of limited relative rotary movement, a pawl rotating with said members and controlled by the said relative movement of the members so as to be projected when one member attempts to drive the other in one direction but retracted when said one member drives the other in the reverse direction, and a fixed member having a surface engaged by said pawl when projected in any position which the pawl may occupy.

7. In combination, two movable members capable of limited relative movement, a pawl mounted to move with said members and controlled by the relative movement of said members so that it is projected when one member attempts to drive the other in one direction but retracted when said one member drives the other in the reverse direction, and a fixed member having a surface engaged by said pawl when projected regardless of the position of the pawl.

8. In combination, a stationary support, a coupling rotatably mounted therein and comprising two members capable of limited relative movement, said support having a surface concentric with said coupling, a member on said coupling adapted to coact with the said surface to resist movement of said coupling, said member being thrown into engagement with said surface when one coupling member moves in one direction with relation to the other, and means for biasing said member out of engagement with said surface.

9. In combination, a support, a coupling comprising two members rotatably mounted therein, said support having a surface concentric with said coupling, a pawl on said coupling adapted to coact with said surface to prevent rotation of said coupling when one member attempts to drive the other in improper direction, and means for holding said pawl out of engagement with said surface when torque is transmitted from one member to the other in a proper direction.

10. In combination, a support, a coupling rotatably mounted therein and comprising two members one for driving the other for one direction of rotation, said support having a surface concentric with said coupling, a pawl on said coupling thrown into engagement with said surface when the driven member attempts to operate the driver in said direction, and means for holding said pawl out of engagement with said surface during rotation in said direction by torque transmitted from the driving member to the driven member.

11. In combination, two movable members capable of limited relative movement, a pawl moving with said members and biased to retracted position but projected when one of said members attempts to drive the other in a given direction, and a third member having a surface engaged by said pawl when projected in any position of its movement.

12. In combination, two members capable of movement in common and also capable of limited relative movement, a fixed member continuous throughout the range of common movement of said members, and a pawl controlled by said relative movement for engaging said fixed member for preventing said common movement in any position of said members.

13. In combination, two rotatable members capable of limited relative rotary movement, a pawl mounted on one member for movement thereon to projected and retracted positions, said pawl having teeth cut therein, teeth on the other member coacting with the teeth on the pawl for moving said pawl to projected or retracted position according as said other member attempts to drive the pawl-carrying member in one direction or the other, a stop on said other member for limiting the retraction of said pawl, and a fixed member co-acting with said pawl to prevent rotation of said members when the pawl is in projected position.

14. In combination, two members mounted to move and capable of limited relative movement, a pawl mounted on one of said members and capable of movement with relation thereto, means on the other member coöperating with the pawl to move the latter with respect to the first member to a projected or a retracted position according as said other member attempts to drive the pawl-carrying member in one direction or the other, and a fixed member co-acting with said pawl to prevent movement of said members when the pawl is in projected position.

In testimony whereof I affix my signature in presence of two witnesses.

JOHN P. COLEMAN.

Witnesses:
M. S. KIRKLAND,
MAE G. KIRKLAND.